United States Patent [19]

Simpson et al.

[11] 3,944,403
[45] Mar. 16, 1976

[54] ADSORPTIVE DEVICES

[75] Inventors: Keith Simpson, Fleet; Frederick Arthur Pomroy Maggs, Salisbury, both of England

[73] Assignee: Siebe Gorman & Company Limited, Chessington, England

[22] Filed: Feb. 25, 1974

[21] Appl. No.: 445,345

[30] Foreign Application Priority Data
Feb. 28, 1973 United Kingdom............... 9848/73

[52] U.S. Cl.................................. 55/316; 55/387
[51] Int. Cl.² .................. B01D 50/00; B01D 53/02
[58] Field of Search......................... 55/387, 316, 74

[56] References Cited
UNITED STATES PATENTS

| | | |
|---|---|---|
| 2,922,488 | 1/1960 | Gruner.................................. 55/316 |
| 3,406,501 | 10/1968 | Watkins................................ 55/316 |
| 3,593,499 | 7/1971 | Kile...................................... 55/387 X |
| 3,675,398 | 7/1972 | Giarrizzo ............................ 55/387 X |
| 3,744,976 | 7/1973 | Tongue................................. 55/316 X |

FOREIGN PATENTS OR APPLICATIONS

| | | | |
|---|---|---|---|
| 1,301,101 | 1972 | United Kingdom............. | 55/74 UX |

*Primary Examiner*—Charles N. Hart
*Assistant Examiner*—Richard W. Burks
*Attorney, Agent, or Firm*—Brisebois & Kruger

[57] ABSTRACT

An adsorptive device having at least one composite adsorptive element through which gas can pass comprising a bed of granular adsorptive carbon and a bed of fibrous adsorptive carbon.

8 Claims, 1 Drawing Figure

U.S. Patent    March 16, 1976    3,944,403
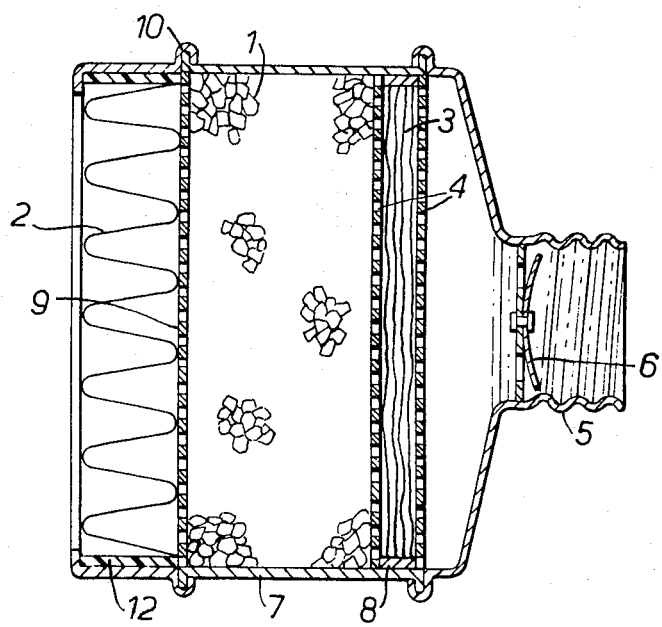

ADSORPTIVE DEVICES

The present invention relates to adsorptive devices for use in removing contaminating gases and vapours from an atmosphere.

The adsorptive properties of activated charcoal are well known and have been widely used, for example, in industrial filtration and decolourisation, for air filtration in respirators and in air conditioning. In the field of respiratory protection adsorbent granules, chiefly activated charcoal, are packed into a filter box or canister such that inspired air passes through a bed of adsorbent granules thus removing toxic and/or other contaminating substances from the air rendering it fit to breathe.

The main factors governing the design of filter boxes or canisters are the concentration of toxic agent in the gas to be passed through, the granule bed depth and granule size in the filter box or canister, the flow velocity of the gas and the gas flow resistance provided by the filter box or canister, and the length of useful life required of the canister. Efficient removal of contaminant calls for either a large depth of medium size granules or a lesser depth of small size granules in the filter box or canister both of which give rise to high breathing, or flow, resistance. The conventional respirator canister is, therefore, a compromise between size and shape, efficiency and resistance.

The invention provides an adsorptive device which comprises a housing and at least one adsorptive element supported in the housing in such a manner that gas can contact and pass through the element from an inlet face to an outlet face, the element being a composite element comprising a bed of granular adsorptive carbon and a bed of fibrous adsorptive carbon, and the arrangement is such that the gas can pass through the granular carbon bed before it reaches the fibrous carbon bed.

In adsorption devices having an adsorbent bed of finite thickness through which a contaminated gas is passed, at any given instant, the concentration of gaseous contaminant in the gas passing through the bed falls off progressively along the bed in an approximately exponential manner. Penetration of the bed by the contaminant occurs immediately but the concentration of the contaminant in the effluent gas is generally too low to be detected. With the passage of the adsorption wave front through the bed a detectable level of contaminant concentration emerges and the penetration time can be recorded. The penetration time can be measured in accordance with any one of a number of different criteria, which include:

i. a given reduction ratio (that is to say, the ratio of the concentration of the contaminant in the gas passing into the adsorptive device to the concentration of the contaminant in the effluent gas);
ii. the maximum acceptable concentration of the contaminant in the effluent gas;
iii. the so-called "threshold limit value" which is the maximum average atmospheric concentration of contaminant to which workers can be exposed (for example, the threshold limit value of trichloroethylene is currently accepted as 100 parts per million) and
iv. the minimum detectable level of concentration of contaminant in the effluent gas (which of course depends on the sensitivity of the detector).

For a given flow rate and concentration of contaminant there will be a bed depth for which the agreed concentration of contaminant in the effluent gas will just be reached immediately and the penetration time recorded as zero. This is known as the "critical bed depth". For the main part of the bed the penetration time will be inversely proportional to the concentration of the contaminant and the flow rate of the gas. When penetration occurs in a wholly granular bed there is a fair amount of adsorptive capacity which has not been used because the leading edge of the wave front is being detected. It has been found that by using a composite element in accordance with the invention comprising a bed of fibrous carbon, which has much higher rates of adsorption than granular carbon (at least 100 times greater) since its surface area is more freely available, the fibrous bed being located downstream of the granular bed, the leading edge of the wave front is adsorbed by the fibrous bed and the penetration time can be greatly extended. This is because the fibrous bed not only adds its own adsorptive capacity to that of the granular bed but also makes it possible for much more of the adsorptive capacity of the granular bed to be used up. Thus, the increase in efficiency can be considerably more than could reasonably be expected especially when only a small amount of fibrous carbon is used, and the efficiency of existing well proven conventional carbon filter equipment can be readily increased with the minimum of redesign.

Although various forms of fibrous carbon may be used in the composite element, the fibrous carbon is advantageously prepared by a process as described and claimed in British Patent Specification No. 1,301,101 and, preferably, comprises a plurality of layers of charcoal cloth.

The increase in penetration time obtained by using a composite filter of a granular bed and a fibrous bed in any particular case over that of the same granular bed alone depends upon the number of layers and type of cloth used, and the penetration time increases as the number of layers of cloth and the heat of wetting of the cloth (which is a measure of the accessible internal adsorption surface of a charcoal) is increased. The fibrous bed should comprise at least three layers of charcoal cloth (one layer being the critical bed depth) and, preferably, at least five layers of charcoal cloth and the charcoal cloth preferably has a heat of wetting of approximately 8.0 calories per gram using silicon oil at a viscosity of 2 centipoise as the wetting liquid.

This increase in penetration time must of course be offset against an increase in air flow resistance, expense, size and weight but it has been found possible to increase the penetration time considerably without increasing by very much the gas flow resistance as compared with that of the same granular bed when used alone and also to decrease the size and weight. Alternatively, it is possible by sacrificing some if not all of the increase in penetration time to reduce considerably the gas flow resistance. For example, a bed 4 centimeters in thickness of $-8$ to $+12$ mesh (B.S.S.) activated charcoal granules tested against a test gas of 1% carbon tetrachloride in air was penetrated after 20 minutes (measured in terms of a reduction ratio of $10^{-4}$, that is to say, 10 parts per million in the effluent gas) at a flow velocity of 3.4 centimeters per second whereas a 4 centimeter bed of charcoal backed by five layers of activated charcoal cloth, which had a total thickness of about 3mm was not penetrated until after 47 minutes using the same flow conditions. In order to achieve a similar penetration time using granules only it was necessary to use a bed depth of 6 centimeters. The air flow resistance (measured at 85 liters per minute) for a 4 centimeter bed of charcoal granules was 62.5mm water, for a 6 centimeter bed of charcoal granules was 93mm water, and for a 4 centimeter bed of charcoal granules plus five layers of charcoal cloth was 67.5mm of water. The cloth used had a heat of wetting of more than 8 calories per gram using silicon oil having a viscosity of two centipoise as the wetting liquid. A further experiment again using a four centimeter granular bed but at a higher flow velocity of 4.2 centimeters per second gave a penetration time of 8 minutes without cloth and 19 minutes with three layers of cloth.

A further advantage of composite carbon filtrate in accordance with the invention is that the packing and size structure of the granular part of the device is less critical and, in particular medium-sized granules may be used to give long penetration times with reduced resistance to gas flow.

The depth of the bed of granular adsorptive carbon is at least 4 centimeters and, preferably, the granular bed is composed of granules within the range of from −8 to +12 mesh (B.S.S.).

If desired, the granular part of the element may be size graded with larger granules at the input end and smaller granules at the output end.

The bed of fibrous adsorptive carbon is advantageously contained between two perforated discs held at a fixed distance from each other. A particulate filter, for example, a glass-fibre paper filter, is preferably provided on the inlet side of the device through which gas can pass before reaching the granular and fibrous beds, and non-return valve means is preferably provided on the outlet side of the device to allow gas to pass out from the fibrous carbon bed.

An adsorptive device constructed in accordance with the invention will now be described, by way of example, with reference to the accompanying drawing which is a diagrammatic cross-sectional view of the device.

Referring to the accompanying drawing, an adsorptive device in the form of a filter canister comprises a cylindrical shell 7 which tapers to a thread 5 at one end; internally the thread contains a non-return valve 6 which is optionally provided in the canister. Several layers of charcoal cloth 3 are held in position between two perforated discs 4 and are prevented from being crushed by a spacer 8. A bed of (8–12 mesh B.S.S.) charcoal granules 1 is held in position by a further perforated disc 9. To assemble the canister the contents are held under pressure by a hydraulic ram (120 psi) while a swage 10 is formed. A glass-fibre paper particulate filter 2 is then sealed in position with a polyurethane rubber band 12.

A normal industrial respirator complying with the gas adsorption requirements of British Standard No. 2091/1970 may be provided with a canister filter to this design having a bed of some 200 grammes of granular charcoal and five layers of charcoal cloth whereas 600 grammes of granular charcoal alone would be needed.

Alternatively, the penetration time of a granular bed filter can be at least doubled by the simple addition of several layers of charcoal cloth to it.

We claim:

1. An adsorptive device comprising:
   a. a housing having a gas inlet and a gas outlet; and
   b. at least one composite adsorptive element, said element being supported in said housing in the gas path through said housing from said inlet to said outlet, said element comprising a bed of adsorptive carbon in granular form, said granular carbon bed having a depth of at least 4 centimeters, and a bed of adsorptive carbon in fibrous form comprising at least three layers of charcoal cloth, said fibrous carbon bed being situated downstream of said granular carbon bed.

2. An adsorptive device according to claim 1, wherein said bed of fibrous adsorptive carbon comprises at least five layers of cloth.

3. An adsorptive device according to claim 1, wherein said charcoal cloth has a heat of wetting of approximately 8.0 calories per gram using silicon oil at a viscosity of 2 centipoise as the wetting liquid.

4. An adsorptive device according to claim 1, wherein said granular bed is composed of granules of size within the range of from −8 to +12 mesh (B.S.S.).

5. An adsorptive device according to claim 1, wherein said composite adsorptive element comprises two perforated discs and spacer means between the two discs maintaining the discs at a fixed distance from each other, said fibrous adsorptive carbon bed being contained between said two discs.

6. An adsorptive device according to claim 1, which comprises a particulate filter situated upstream of said granular adsorptive carbon bed.

7. An adsorptive device according to claim 6, wherein said particulate filter is a glass-fibre paper filter.

8. An adsorptive device according to claim 1, wherein non-return valve means is provided downstream of said fibrous adsorptive carbon bed.

* * * * *